United States Patent

Gerlach et al.

Patent Number: 5,391,207
Date of Patent: Feb. 21, 1995

[54] LIQUID DYESTUFF PREPARATIONS

[75] Inventors: Rainer Gerlach; Winfried Mennicke, both of Leverkusen; Wolfgang Müllers, Bergisch Gladbach, all of Germany

[73] Assignee: Bayer Aktiengesellschaft, Leverkusen, Germany

[21] Appl. No.: 221,272

[22] Filed: Mar. 30, 1994

Related U.S. Application Data

[63] Continuation of Ser. No. 913,503, Jul. 14, 1992, abandoned.

[30] Foreign Application Priority Data

Jul. 24, 1991 [DE] Germany ............... 4124451

[51] Int. Cl.$^6$ .................................. D06P 3/32
[52] U.S. Cl. .......................... 8/437; 8/587; 8/682; 8/685; 8/527
[58] Field of Search ............... 8/437, 587, 682, 685

[56] References Cited

U.S. PATENT DOCUMENTS

| | | | |
|---|---|---|---|
| 3,989,452 | 11/1976 | Hugelshofer | 8/527 |
| 4,083,689 | 4/1978 | Wolf et al. | 8/524 |
| 4,163,012 | 7/1979 | Kramer et al. | 534/583 |
| 4,179,267 | 12/1979 | Lacroix et al. | 8/585 |
| 4,648,884 | 3/1987 | Koci | 8/527 |

FOREIGN PATENT DOCUMENTS 1165311  9/1969  United Kingdom .

OTHER PUBLICATIONS

Toxicology, 27 (1983) 91–102, Elsevier Scientific Publishers Ltd. *No month available.

*Primary Examiner*—Paul Lieberman
*Assistant Examiner*—Necholus Ogden
*Attorney, Agent, or Firm*—Sprung Horn Kramer & Woods

[57] ABSTRACT

Improved dyestuff solutions for the dyeing of leather contain 5 to 30 parts by weight of a dyestuff, 20 to 80 parts by weight of an alkoxy alcohol of the formula (I)

$$R-O-(-A-O-)_n-H \qquad (I),$$

10 to 40 parts by weight of a lactone, lactam or cyclic urea and 5 to 50 parts by weight of water.

16 Claims, No Drawings

LIQUID DYESTUFF PREPARATIONS

This application is a continuation of application Ser. No. 07/913,503, now abandoned, filed Jul. 14, 1992.

For the dyeing of leather, not only solid but also liquid dyestuff preparations can be used. If the leather dyeing is carried out during the finishing stage, i.e. during that stage of leather manufacture in which tanning has already been completed, almost exclusively liquid dyestuff preparations are used, for example in the colouration of aqueous and organic leather seasonings, in the pressure-dyeing and most frequently in the spray-dyeing of leather.

Suitable liquid preparations are preferably concentrated solutions of anionic dyestuffs in mixtures of water with water-miscible organic solvents. Anionic dyestuffs which are suitable for the preparation of such concentrated stock solutions are in particular acid and metal complex dyestuffs. By virtue of the presence of at least one anionic group, for example a carboxyl, an acetylated sulphonamide or, preferably, a sulpho group, the preferred dyestuffs are water-soluble. Metal complex dyestuffs may also constitute an anionic group if the negative charge of all ligands is greater than the positive charge of the central metal atom. Apart from these anionic groups mentioned, the dyestuffs can additionally carry nonionic water-solubilising groups, for example a sulphonamide group, a sulphonamide group which is substituted on the nitrogen by lower alkyl or lower hydroxyalkyl, such as N-methyl-, N-ethyl-, N-propyl- or N-2-hydroxyethylsulphonamide, or a lower alkylsulphonyl group, such as methylsulphonyl or ethylsulphonyl.

The selection of the organic water-miscible solvent is decisive for the shelf life or storage stability of the concentrated dyestuff solution, for the penetration of the leather substrate by the anionic dyestuff, for the levelness and the rubfastness of the dyeing and finally for the drying of the dyed leathers. In principle a large number of organic solvents, such as are mentioned, for example, in DE-A-2,033,989, are suitable for the preparation of such liquid formulations.

Owing to their wide range of application, alkoxy alcohols are frequently recommended as solvents, for example in DE-A-1,719,396. EP-A-77,965 relates to a process for the preparation of lithium salt solutions of metal complex dyestuffs, in which the preferably used solvents are also alkoxy alcohols. According to EP-A-169,816, the monoalkyl ethers of propylene glycol and butylene glycol are used for the preparation of anionic dyestuff solutions. For reasons of industrial hygiene (cf. J. E. Hamlin, Polym. Paint Colour J. 174 (4125), p. 568 (1984) and B. D. Hardin: Reproductive Toxicity of the Glycol Ethers, Toxicology 27 (1983) pp. 91–102), the monoalkyl ethers of propylene glycol and butylene glycol should be given preference over those of ethylene glycol.

By using monoalkyl ethers of ethylene glycol and propylene glycol, it is in general possible to prepare concentrated storage-stable stock solutions of anionic dyestuffs. However, it has been shown that in some cases solutions of this type are not stable when applied to organic and even less so when applied to aqueous seasonings. This results in the formation of dyestuff aggregates, in agglutinations and agglomerations, which after being sprayed onto leather show up on the dyeing in the form of spots and possibly streaks and specks.

Surprisingly, it has now been found that disadvantages of this type can be avoided by adding certain cyclic esters and amides to the stock solution.

Accordingly, the present invention relates to stable, highly concentrated dyestuff solutions which are miscible with water in any ratio and which contain:

5 to 30 parts by weight, in particular 12 to 23 parts by weight, of one or more ionic metal-free azo dyestuffs and/or metal-containing azo and/or azomethine dyestuffs.

15 to 80 parts by weight, in particular 20 to 60 parts by weight, of one or more alkoxy alcohols of the formula (I)

$$R\text{—}O\text{—}(\text{—}A\text{—}O\text{—})_n\text{—}H \qquad (I),$$

in which
R denotes a straight-chain or branched $C_1$–$C_4$-alkyl,
A denotes a straight-chain or branched $C_2$–$C_3$-alkylene and
n denotes 1, 2 or 3, 6 to 40 parts by weight, preferably 10 to 35 parts by weight, in particular 13 to 25 parts by weight, of a lactone, lactam or cyclic urea or a mixture thereof and 5 to 50 parts by weight of water.

In a preferred embodiment, the composition is substantially made up of these components.

The dyestuffs to be used according to the invention are in general acid azo dyestuffs and preferably metal complex dyestuffs, either metal complex dyestuffs free of sulpho groups or those containing a sulpho group, the metal-free azo dyestuffs and the azo dyestuffs on which the metal complex dyestuffs are based mainly belong to the benzeneazobenzene, benzeneazonaphthalene, naphthaleneazonaphthalene, benzeneazopyrazolone, benzeneazoacetoacetamide or benzeneazoacetonylbenzothiazole series.

Suitable metal complexes are the 1:1 copper complexes, 1:1 nickel complexes and/or 1:1 chromium complexes, but preferably the 1:2 chromium complexes, 1:2 cobalt complexes and/or 1:2 iron complexes of azo, disazo, azomethine or azoazomethine dyestuffs, where, in the case of the 1:2 metal complexes, these dyestuffs can be identical or different and one dyestuff ligand can be an azo and the other an azomethine or azoazomethine dyestuff.

Unsymmetrical 1:2 metal complex dyestuffs of this type are described, for example, in German Auslegeschrift 1,012,007, and the Patent Specifications DE-A-3,133,569, EP-A-66,230 and EP-A-72,501.

Particular preference is given to symmetrical 1:2 metal complex azo dyestuffs of chromium or cobalt containing at least one sulphonamide group and/or unsymmetrical 1:2 metal complex dyestuffs containing one sulpho group and/or one sulphonamide group.

To prepare the dyestuff solutions according to the invention, the abovementioned dyestuffs are preferably used in the form of their metal salts, such as are formed during the synthesis, for example in the form of the alkali metal salts, such as lithium salts, sodium salts and/or potassium salts, and/or in the form of the ammonium salts which are unsubstituted or substituted by lower alkyl or hydroxyalkyl. In the case of the metal-free acid dyestuffs the sodium salts and in the case of the metal complex dyestuffs the lithium salts are preferred.

The dyestuffs known per se are prepared by known methods. An advantageous process relating to metal complex dyestuffs is described in DE-A-2,443,483, in which, for example, an adduct of a metal-free dyestuff with a 1:1 chromium complex is formed in the presence of the solvent and an alkaline lithium salt, which results in the simultaneous formation of the concentrated solution of the lithium salt of a 1:2 chromium complex dyestuff.

pylene glycol monoethyl ether, tripropylene glycol monomethyl ether or tripropylene glycol monoethyl ether.

The mono-$C_1$-$C_4$-alkyl ethers derived from mono-, di- and tripropylene glycol are in general prepared by forming an adduct of 1 mol of $C_1$-$C_4$-alcohol with 1, 2 or 3 mol of propylene oxide (PO), in which, apart from the alkoxy propanols having a secondary OH group, the isomeric primary alcohols are also formed to a slight extent, for example according to the following scheme:

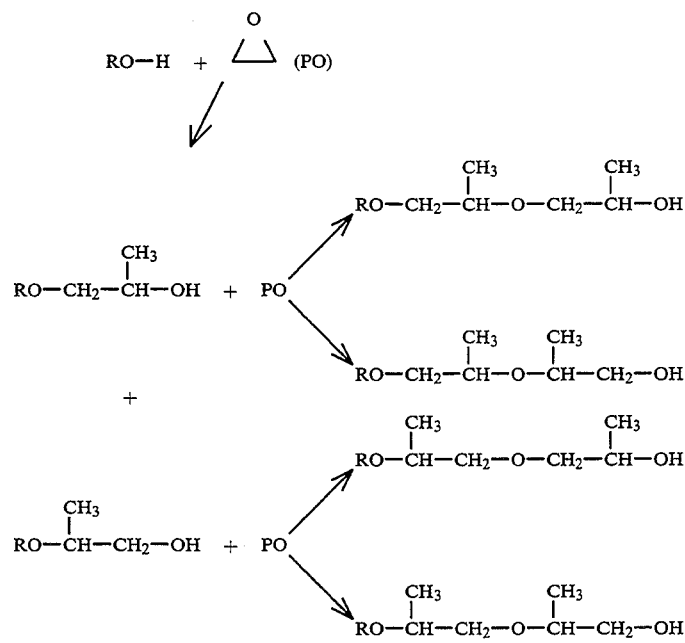

A general procedure for obtaining the solutions according to the invention consists in stirring the dyestuff in paste or powder form, preferably the dried dyestuff in an alkoxy alcohol of the formula (I), if necessary with heating to 40°–90° C., for example about 70° C. and with the addition of the minimum amount of water until it is completely dissolved, separating off the undissolved salts by filtration, and adding one of the abovementioned cyclic compounds to the filtrate and adjusting the mixture to the desired colour strength by means of water. However, desalting can also take place using the moist dyestuff paste or aqueous dyestuff solution by means of known membrane separation processes, for example by ultra- or hyperfiltration.

Examples of solvents of the formula (I) are: ethylene glycol monomethyl ether, ethylene glycol monoethyl ether, ethylene glycol monopropyl ether, ethylene glycol monoisopropyl ether, diethylene glycol monomethyl ether, diethylene glycol monoethyl ether, diethylene glycol monopropyl ether, diethylene glycol mono-iso-propyl ether, diethylene glycol monobutyl ether, triethylene glycol monomethyl ether, triethylene glycol monoethyl ether, 1-methoxy-2-propanol, 2-methoxy-1-propanol, 1-ethoxy-2-propanol, 2-ethoxy-1-propanol, 1-propoxy-2-propanol, 2-propoxy-1-propanol, 1-iso-propoxy-2-propanol, 2-iso-propoxy-1-propanol, dipropylene glycol monomethyl ether, dipro- Those mixtures which are necessarily formed as a result of the synthesis are also suitable for the preparation of the liquid formulations according to the invention. In terms of their physical properties, the solvents which are particularly suitable are ethylene glycol monomethyl ether, ethylene glycol monoethyl ether, 1-methoxy-2-propanol and 1-ethoxy-2-propanol.

Examples of representatives from the series comprising lactones, lactams and cyclic ureas are 4-butyrolactone, pyrrolidone, 6-caprolactam and 1,3-dimethyl-2-imidazolidinone.

ε-Caprolactam, N-methylpyrrolidone and N-alkyl-ε-caprolactam, for example N-methyl- and/or N-ethyl-ε-caprolactam, are particularly useful. Preference is given to the two latter agents. When these solid or slightly volatile compounds are used, the customary drying techniques can be maintained since, surprisingly, no traces in the form of a tacky or non-tacky residue or film are formed. What is improved, in contrast, is the levelness of the effect-producing treatment, i.e. the levelness at the time the seasoning to which the dyestuff solution has been added is sprayed onto the leather. Depending on the shade, higher brilliance or colour depth can also be observed.

The liquid dyestuff preparations preferably contain at least one dyestuff of the following formula:

1:2 cobalt complex of
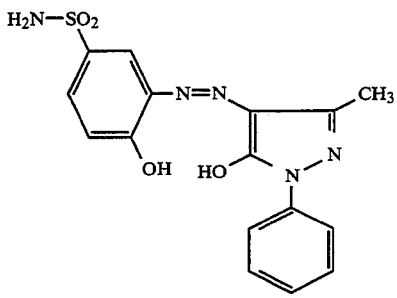
II-1
uniform 1:2 chromium mixed complex of
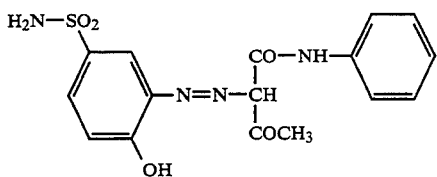
II-2
1:2 chromium complex of
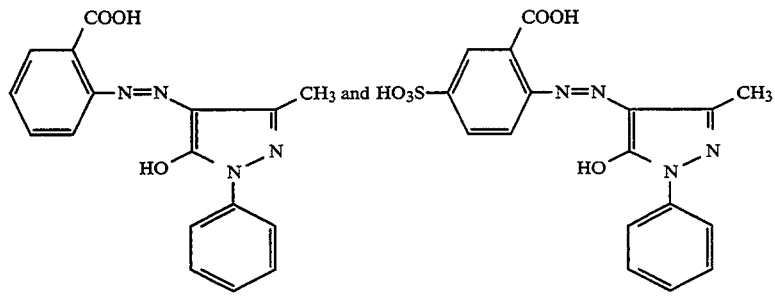
II-3
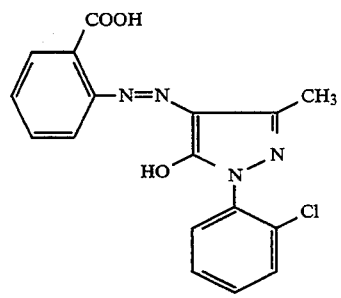
II-4
1:2 cobalt complex of
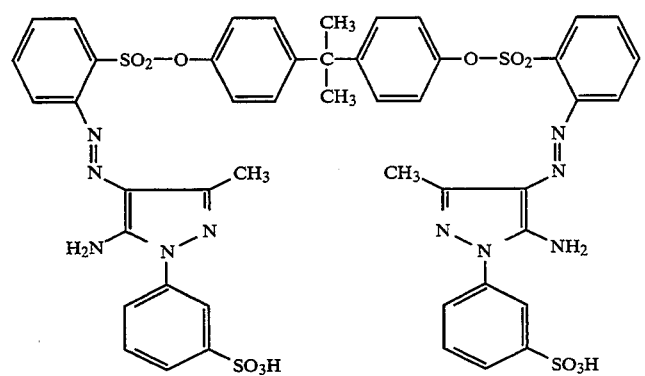
II-5

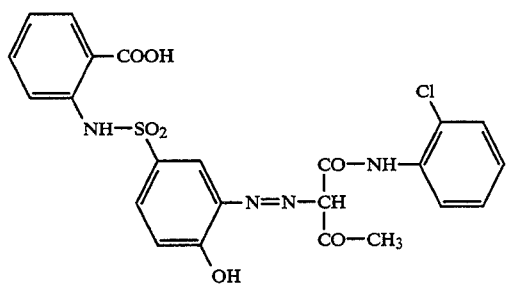
II-6
1:2 chromium complex of
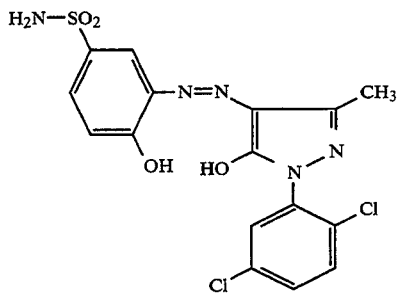
II-7
1:2 cobalt complex of
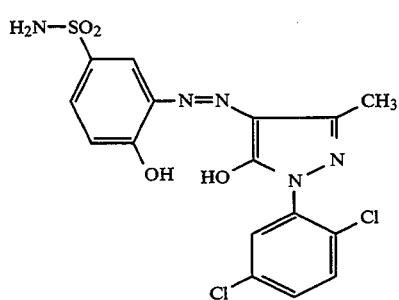
II-8
uniform 1:2 chromium mixed complex of
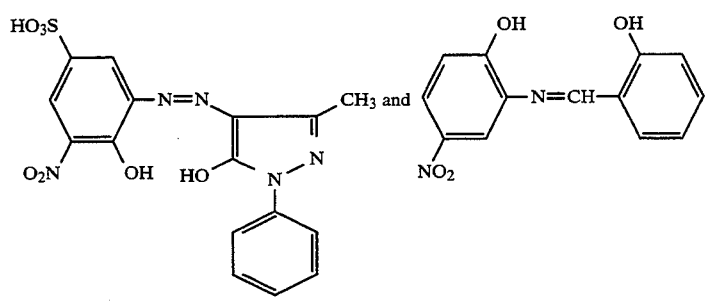
II-9
uniform 1:2 chromium mixed complex of
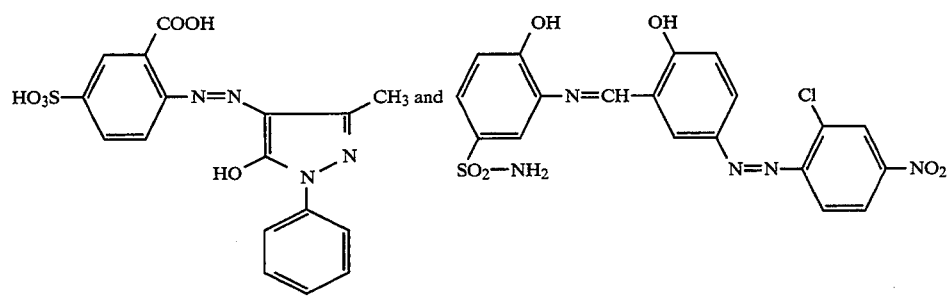
II-10
uniform 1:2 chromium mixed complex of -continued
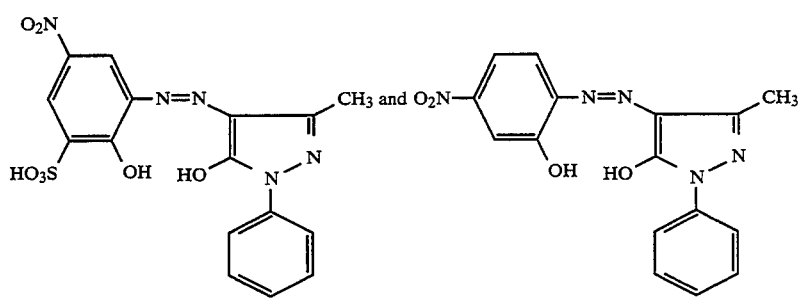
II-11
uniform 1:2 chromium mixed complex of
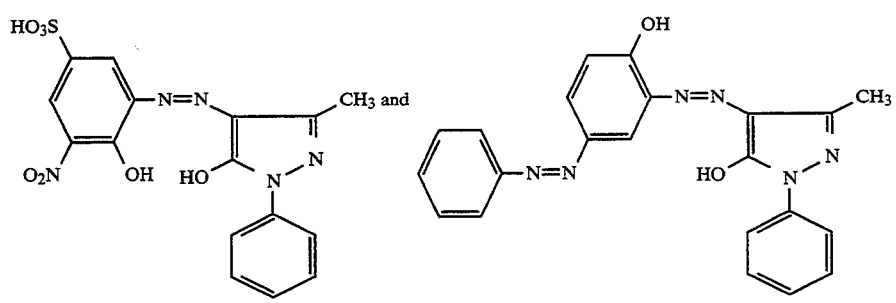
II-12
uniform 1:2 chromium mixed complex of
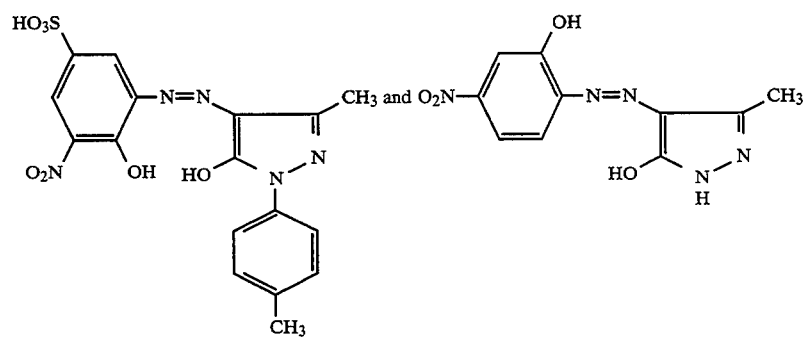
II-13
uniform 1:2 chromium mixed complex of
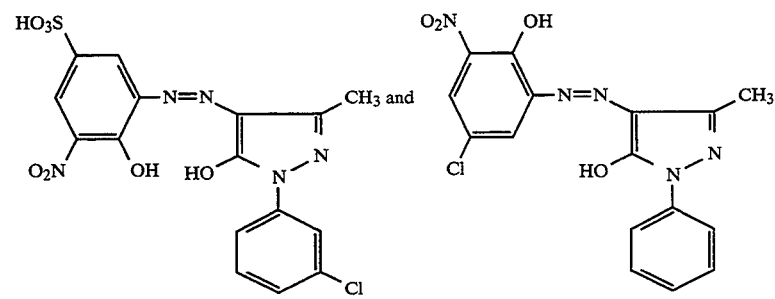
II-14

II-15
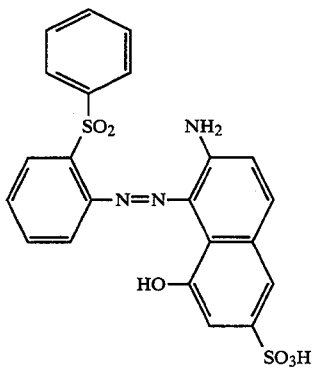
1:2 chromium complex of
II-16
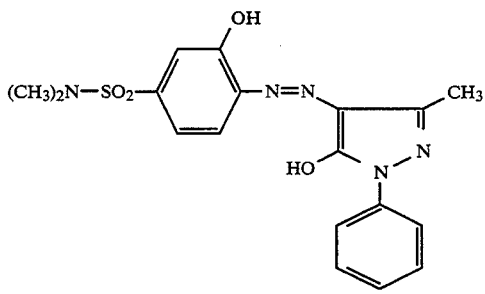
1:2 chromium complex of
II-17
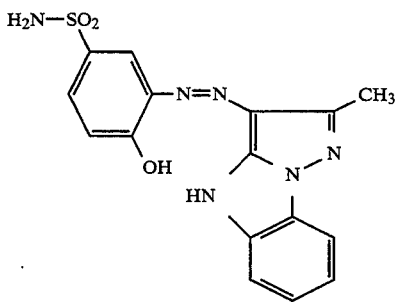
1:2 cobalt complex of
II-18
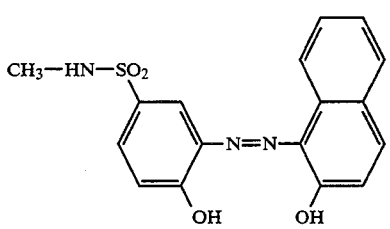
uniform 1:2 chromium mixed complex of
II-19
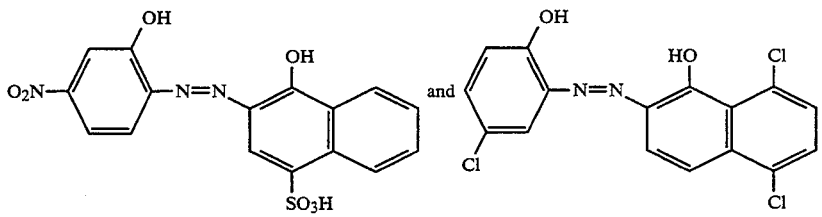
uniform 1:2 chromium mixed complex of -continued
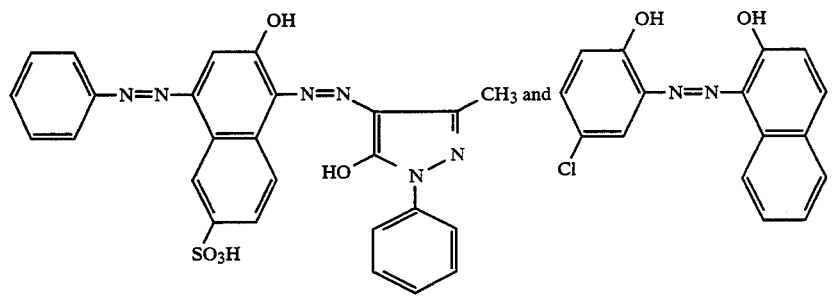
II-20
uniform 1:2 chromium mixed complex of
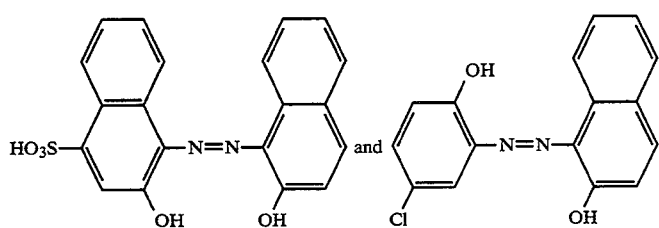
II-21
uniform 1:2 chromium mixed complex of
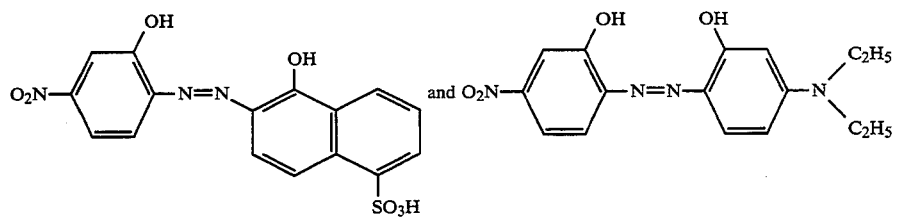
II-22
uniform 1:2 chromium mixed complex of
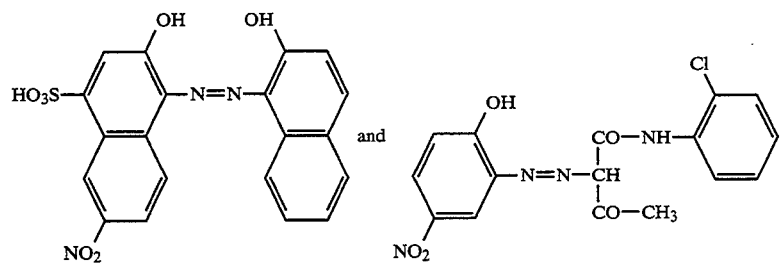
II-23
uniform 1:2 chromium mixed complex of
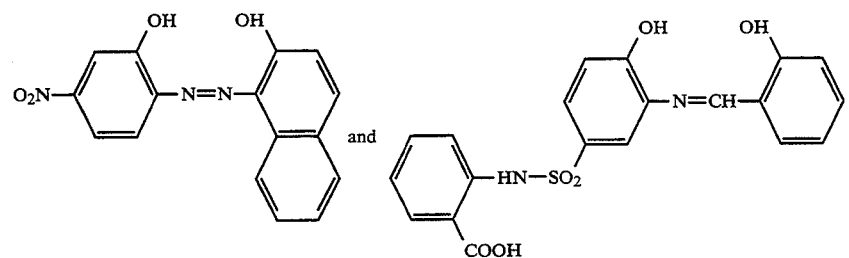
II-24
mixed 1:2 cobalt complex of

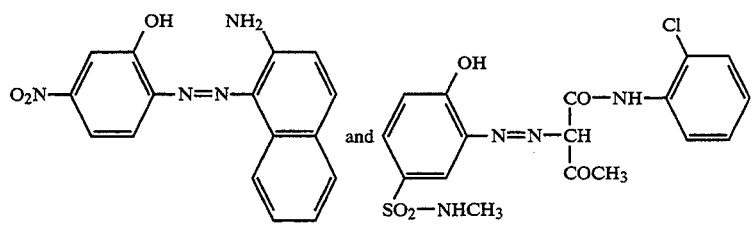
II-25
mixed 1:2 chromium complex of
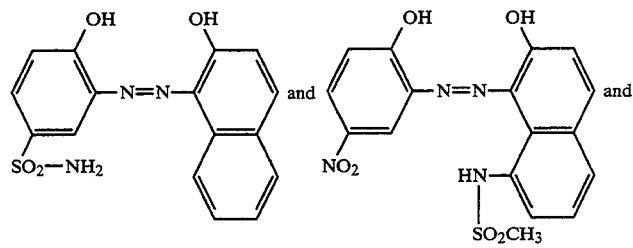
II-26
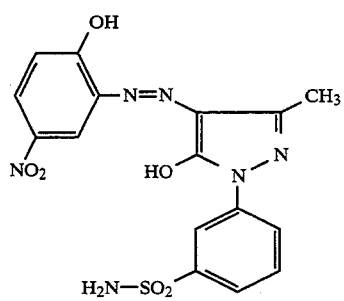
mixed 1:2 chromium complex of
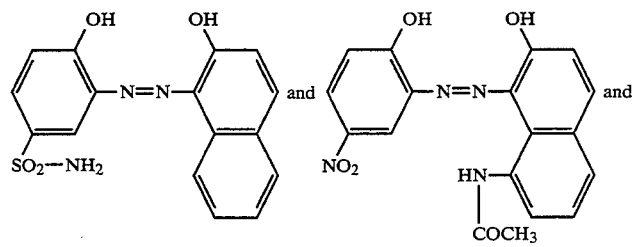
II-27
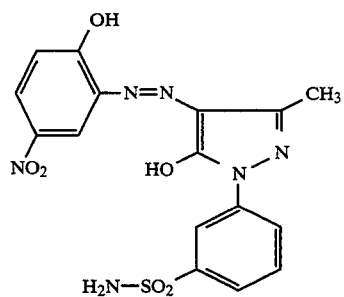
uniform 1:2 chromium mixed complex of -continued
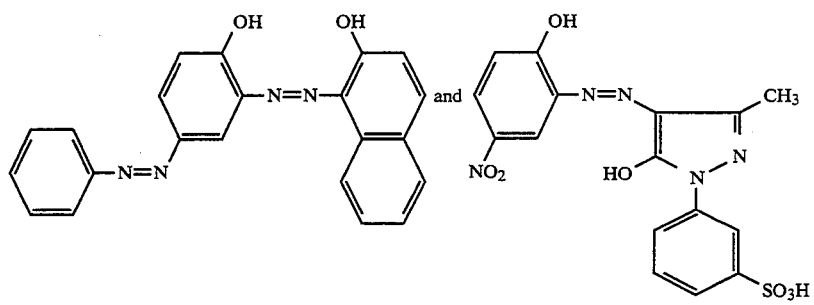
II-28
uniform 1:2 chromium mixed complex of
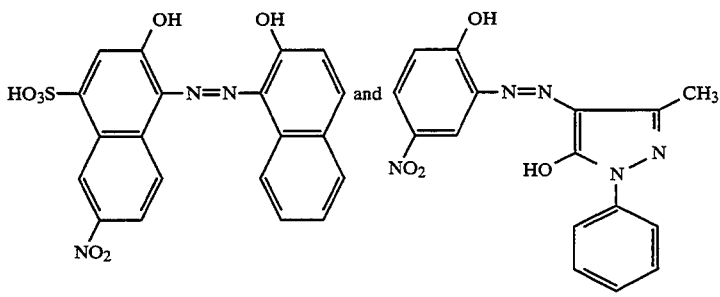
II-29
uniform 1:2 chromium mixed complex of
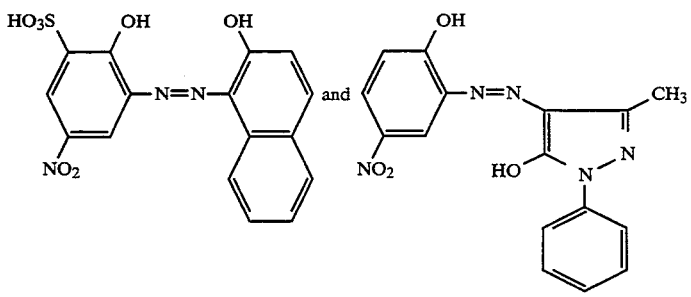
II-30
uniform 1:2 chromium mixed complex of
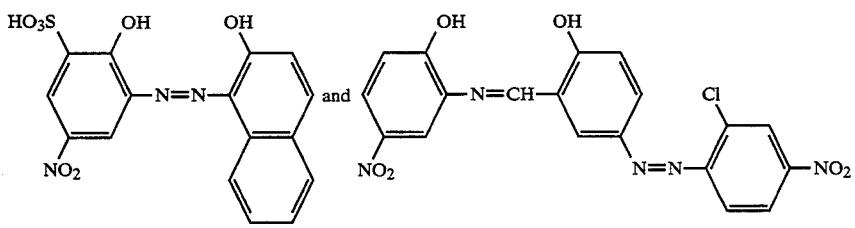
II-31
uniform 1:2 chromium mixed complex of
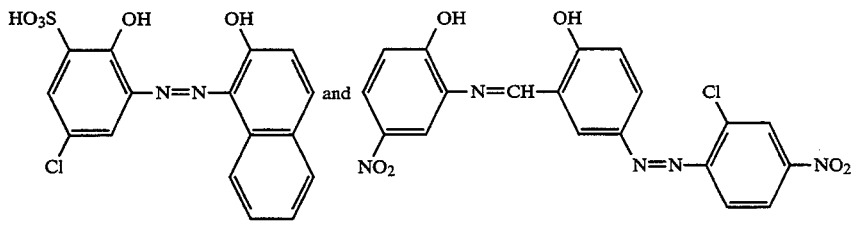
II-32
uniform 1:2 chromium mixed complex of

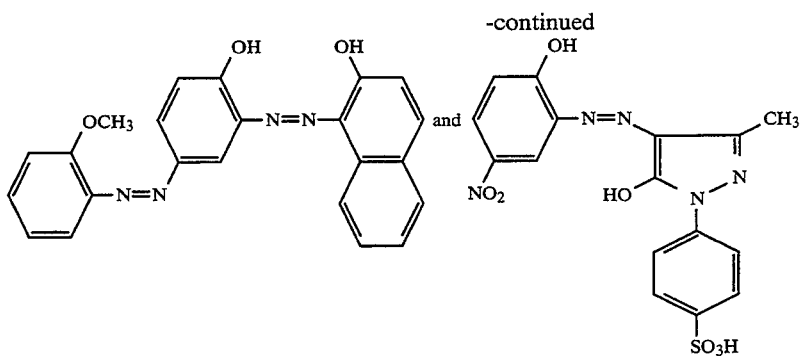
II-33
1:2 iron complex of
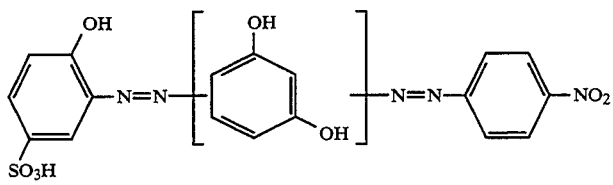
II-34
1:2 iron complex of
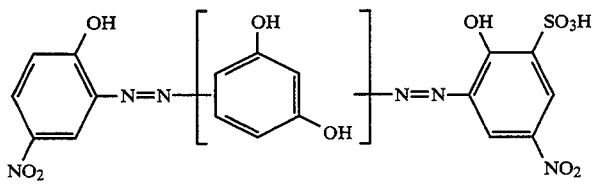
II-35
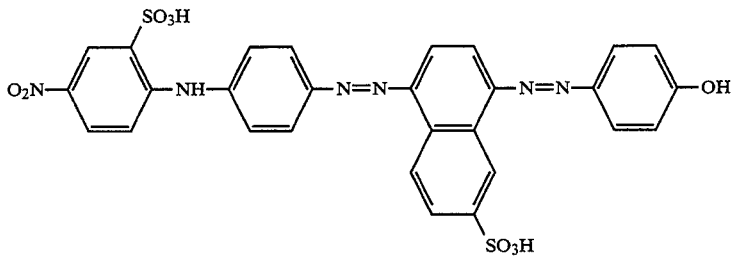
II-36
1:2 chromium complex of
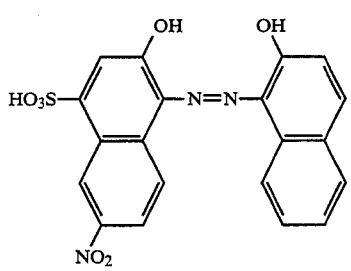
II-37
uniform 1:2 chromium mixed complex of
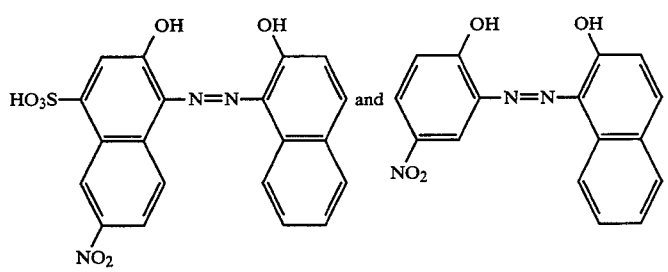
II-38 uniform 1:2 chromium mixed complex of
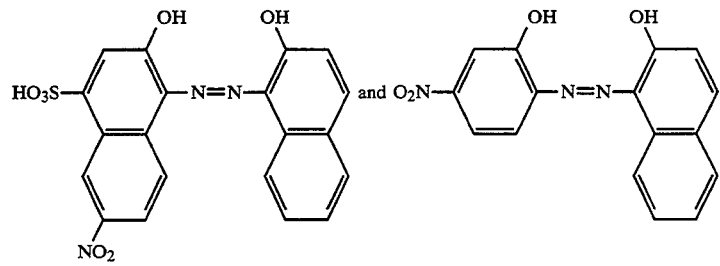
II-39
uniform 1:2 chromium mixed complex of
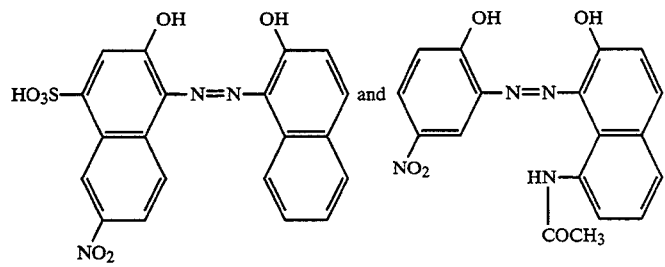
II-40
uniform 1:2 chromium mixed complex of
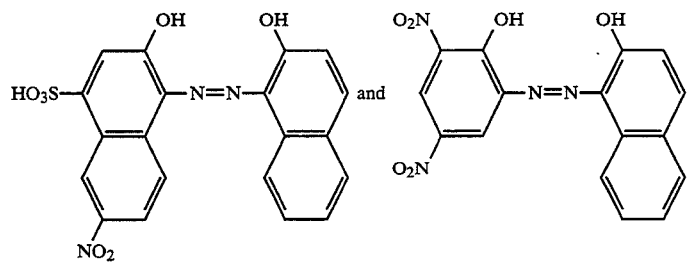
II-41
1:2 chromium complex of
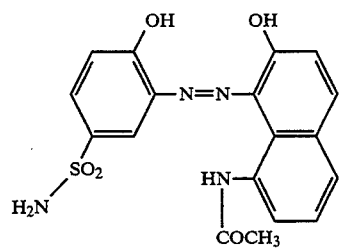
II-42
mixed 1:2 chromium complex of
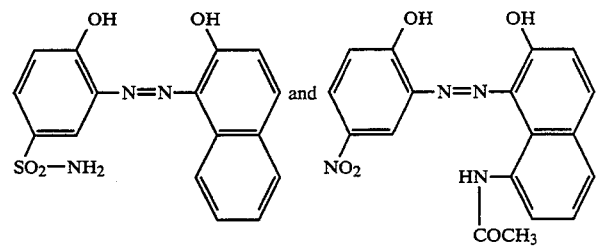
II-43
1:2 chromium complex of

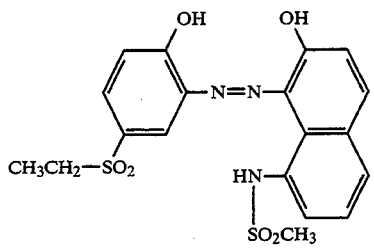

II-44

Suitable seasonings for the finishing of leather which are compatible with the liquid formulations according to the invention are aqueous polyurethane and polyacrylate dispersions, aqueous and organic cellulose nitrate lacquer and acetobutyrate emulsions and, if desired, further emulsions based on casein.

Concentrated dyestuff solutions according to the invention can additionally contain further customary additives, such as emulsifiers, dispersants, antifoams, wetting agents, and the like, in small amounts. They can be used for the preparation of spraying liquors, coloured leather seasonings and aqueous dyebaths and are thus suitable for the dyeing of a variety of materials, in particular of nitrogen- and hydroxyl-containing materials, such as polyurethane and polyamide fibres, wool, silk and leather. The preferred area of application is the dyeing of leather by various application methods, either drum-dyeing from an aqueous dye liquor, dyeing using a continuous dyeing apparatus or spray-dyeing with or without leather seasoning.

EXAMPLE 1

200.5 g of monoazo dyestuff obtained from diazotised 2-amino-5-dimethylaminosulphonylphenol and 1-phenyl-3-methyl-5-pyrazolone are stirred in 610 g of 1-ethoxy-2-propanol to give a homogeneous suspension. Basic chromium acetate containing 13 g of chromium and 21 g of LiOH×H$_2$O are added, the entire batch is heated to 90° C. over a period of about 1 hour, while maintaining the pH in the range from 5.5 to 6.5 by addition of further LiOH×H$_2$O in a total amount of about 11 g. As soon as the pH remains constant, the temperature is raised, and the mixture is refluxed for two hours until the dyestuff has been completely converted into the 1:2 chromium complex. After cooling to room temperature, the salts formed and precipitated during the reaction are separated off by filtration.

After addition of 305 g of N-methyl-ε-caprolactam and 200 g of distilled water to the filtrate, a stable bright red dyestuff preparation is obtained, from which no 1:2 chromium complex dyestuff is precipatated after standing for an extended period of time even at temperatures below the freezing point and after mixing with finishing recipes.

Preparations of this dyestuff having similar properties are obtained by using a different alkoxy alcohol instead of 1-ethoxy-2-propanol, for example 1-methoxy-2-propanol, ethylene glycol monomethyl ether or ethylene glycol monoethyl ether, or by exchanging N-methyl-ε-caprolactam for N-ethyl-ε-caprolactam, N-methylpyrrolidone or 1,3-dimethyl-2-imidazolidinone.

EXAMPLE 2

194 g of the 1:2 cobalt complex compound of 1-(2'-hydroxy-5'-methylaminosulphonylazo)-2-naphthol are introduced in the form of the lithium salt into a mixture of 765 g of 1-ethoxy-2-propanol, 383 g of N-methyl-ε-caprolactam and 320 g of distilled water, and the mixture is heated to 60° C. over a period of about one hour with stirring. This gives a bordeaux dyestuff preparation which no longer contains any undissolved salts. The solution undergoes no change even after standing for an extended period of time at room temperature or lower temperatures and can be incorporated in aqueous finishing liquors without precipitation.

EXAMPLE 3

171.5 g of monoazo dyestuff obtained from diazotised 2-aminophenol-4-sulphonamide and 2-naphthol and 183 g of monoazo dyestuff obtained from diazotised 4-nitro-2-aminophenol and 8-acetamino-2-naphthol are stirred together with basic chromium acetate containing 26 g of chromium in 745 g of 1-ethoxy-2-propanol until a homogeneous suspension is obtained. 42 g of LiOH×H$_2$O are added, the mixture is heated to 80° C. over a period of about one hour, while maintaining the pH at 5–6 by addition of a further 20 to 25 g of LiOH×H$_2$O. After about one hour at 80° C. the pH remains constant The temperature is now increased to 100° C. and maintained at this level for about 2 hours until the two starting dyestuffs have completely reacted. The solution of the 1:2 metal complex dyestuffs is allowed to cool to room temperature, and the undissolved electrolytes are filtered off with suction. 372 g of N-methyl-ε-caprolactam and 360 g of distilled water are then added to the filtrate. This gives a black dyestuff preparation which is distinguished by high storage stability and good compatibility with finishing liquors.

EXAMPLES 4 TO 20

Similar preparations which are stable and readily miscible with aqueous finishing liquors can also be obtained from other metal-free or metal-containing dyestuffs using 1-ethoxy-2-propanol, N-methyl-ε-caprolactam and distilled water. The following table shows the composition of such preparations in % by weight.

| Example No. | Dyestuff of the formula | 1-Ethoxy-2-propanol | N-Methyl-ε-caprolactam | Water |
|---|---|---|---|---|
| 4 | II-5 15 | 50 | 10 | 25 |
| 5 | II-2 21 | 42 | 24 | 13 |
| 6 | II-8 24 | 35 | 25 | 16 |
| 7 | II-10 14 | 45 | 10 | 31 |
| 8 | II-15 15 | 25 | 25 | 35 |
| 9 | II-13 18 | 48 | 12 | 22 |
| 10 | II-19 20 | 42 | 15 | 23 |
| 11 | II-21 | 42 | 18 | 18 |

-continued

| Example No. | Dyestuff of the formula | 1-Ethoxy-2-propanol | N-Methyl-ε-capro-lactam | Water |
|---|---|---|---|---|
| 12 | II-29 22 | 55 | 5 | 18 |
| 13 | II-28 22 | 52 | 5 | 25 |
| 14 | II-31 18 | 55 | 5 | 23 |
| 15 | II-32 17 | 55 | 5 | 24 |
| 16 | II-23 16 | 38 | 22 | 17 |
| 17 | II-25 23 | 37 | 28 | 16 |
| 18 | II-44 19 | 36 | 26 | 13 |
| 19 | II-38 ± 39 25 | 50 | 10 | 20 |
| 20 | II-38 ± 40 20 | 40 | 18 | 17 |
| 21 | II-38 25 | 45 | 16 | 21 |
| 22 | II-41 18 | 44 | 20 | 19 |
| 23 | II-38 ± 41 17 | 35 | 19 | 17 |
|   | 19 |   |   |   |

EXAMPLE 21

10 g each of a dyestuff preparation from Example 1, 2 and 3 are stirred into the following aqueous finishing recipes comprising

- 500 ml of water and 500 ml of a collodion/polyether emulsion containing xylene and 2-propanol
- 600 ml of water, 200 ml of the same collodion/polyether emulsion as above and 200 ml of an aqueous polyurethane dispersion
- 500 ml of water and 500 ml of a cellulose acetobutyrate emulsion containing butyl acetate and ethylhexyl acetate
- 600 ml of water, 200 ml of the same aqueous polyurethane dispersion as above and 200 ml of the same cellulose acetobutyrate emulsion as above
- 600 ml of water, 200 ml of the same cellulose acetobutyrate emulsion as above and 200 ml of an aqueous dispersion of an acrylate copolymer
- 600 ml of water, 200 ml of the same collodion/polyether emulsion as above and 200 ml of the same aqueous dispersion of an acrylate copolymer as above.

In all cases, good to very good mixing resulting in a homogeneous phase is achieved.

If, however, the preparations contain the same amount of 1-ethoxy-2-propanol instead of N-methyl-ε-caprolactam, the colourability of these recipes decreases significantly; when the recipe is stirred together with the dyestuff preparation, in some cases the formation of deposits ranging from fine flakes to coarse dyestuff specks and in other cases even extensive precipitations are observed.

What is claimed is:

1. A process for the dyeing of leather which comprises applying to the leather a liquid dyestuff preparation containing 5 to 30 parts by weight of at least one ionic metal-free azo dyestuff or metal-containing azo or azomethine dyestuff, 15 to 80 parts by weight of at least one alkoxy alcohol of the formula $$R-O-(-A-O-)_n-H \qquad (I),$$

in which

R denotes straight-chain or branched $C_1$-$C_4$-alkyl,
A denotes straight-chain or branched $C_2$-$C_3$-alkylene and
n denotes 1, 2 or 3, 6 to 40 parts by weight of at least one of a lactone, lactam or cyclic urea, and
5 to 50 parts by weight of water.

2. The process of claim 1, in which the liquid preparation contains
12 to 23 parts by weight of the dyestuff,
20 to 60 parts by weight of the alkoxy alcohol (I), and
10 to 35 parts by weight of the lactone, lactam or cyclic urea.

3. The process of claim 1, in which the dyestuff is at least one of a symmetrical 1:2 metal complex azo dyestuff of chromium or cobalt containing at least one sulphonamide group and an unsymmetrical 1:2 metal complex dyestuff containing at least one of a sulpho group and a sulphonamide group.

4. The process of claim 1, in which the solvent is at least one of ethylene glycol monoethyl ether, diethylene glycol monomethyl ether, diethylene glycol monoethyl ether, diethylene glycol monobutyl ether, 1-methoxy-2-propanol, 2-methoxy-1-propanol, 1-ethoxy-2-propanol, 2-ethoxy-1-propanol, 1-propoxy-2-propanol, 1-iso-propoxy-2-propanol, dipropylene glycol monomethyl ether or dipropylene glycol monoethyl ether.

5. The process of claim 1, in which the lactone, lactam or cyclic urea is at least one of ε-caprolactam, N-methyl-pyrrolidone and an N-alkylcaprolactam.

6. The process of claim 1, in which the lactone, lactam or cyclic urea is at least one of ε-caprolactam, N-methyl- and N-ethyl-ε-caprolactam.

7. The process of claim 1, in which the liquid preparation contains 5 to 30 parts by weight of at least one symmetrical 1:2 metal complex azo dyestuff of chromium or cobalt containing at least one sulphonamide group and an unsymmetrical 1:2 metal complex dyestuff containing at least one of a sulpho group and a sulphonamide group, 15 to 80 parts by weight of at least one of 1-methoxy-2-propanol, 2-methoxy-1-propanol, 1-ethoxy-2-propanol, 2-ethoxy-1-propanol, 1-propoxy-2-propanol, 1-iso-propoxy-2-propanol, dipropylene glycol monomethyl ether and dipropylene glycol monoethyl ether, 6 to 40 parts by weight of at least one of ε-caprolactam, N-methyl-ε-caprolactam and N-ethyl-ε-caprolactam, and 5 to 50 parts by weight of water.

8. The process of claim 7, in which the liquid preparation contains 12 to 23 parts by weight of the dyestuff,
20 to 60 parts by weight of at least one of 1-methoxy-2-propanol, 2-methoxy-1-propanol, 1-ethoxy-2-propanol, 2-ethoxy-1-propanol, 1-propoxy-2-propanol, 1-iso-propoxy-2-propanol, dipropylene glycol monomethyl ether and dipropylene glycol monoethyl ether, and 10 to 35 parts by weight of at least one of ε-caprolactam, N-methyl-ε-caprolactam and N-ethyl-ε-caprolactam.

9. The process of claim 1, in which the liquid preparation additionally contains at least one of a seasoning for the finishing of leather, emulsifier, a dispersant, an antifoam agent and a wetting agent.

10. The process of claim 9, in which the liquid preparation contains a seasoning for the finishing of leather selected from the group consisting of an aqueous polyurethane and polyacrylate dispersion, an aqueous and organic cellulose nitrate lacquer and an acetobutyrate emulsion, and optionally a further emulsion based on casein.

11. The process of claim 8, in which the liquid preparation includes a finishing agent comprising at least one of a collodium/polyether emulsion,
polyurethane dispersion,
cellulose acetobutyrate emulsion, and
dispersion of an acrylate copolymer.

12. The process of claim 10, in which the liquid preparation includes a finishing agent comprising at least one of a collodion/polyether emulsion,
polyurethane dispersion,
cellulose acetobutyrate emulsion, and
dispersion of an acrylate copolymer.

13. A process for the preparation of a dyestuff solution according to claim 9, which comprises dissolving the dyestuff in 15 to 80 parts by weight of at least one of 1-methoxy-2-propanol, 2-methoxy-1-propanol, 1-ethoxy-2-propanol, 2-ethoxy-1-propanol, 1-propoxy-2-propanol, 1-iso-propoxy-2-propanol, dipropylene glycol mono-methyl ether and dipropylene glycol monoethyl ether, along with the addition of 5 to 50 parts by weight of water, filtering off undissolved salts, and adding to the filtrate 6 to 40 parts by weight of at least one of ε-caprolactam, N-methyl-ε-caprolactam and N-ethyl-ε-caprolactam.

14. A process for the preparation of a dyestuff solution according to claim 10, which comprises dissolving the dyestuff in water containing an alkoxy alcohol and lactam and the finishing agent.

15. The process of claim 1, in which the liquid preparation further contains an effective amount of a leather seasoning agent selected from the group consisting of an aqueous polyurethane or polyacrylate dispersion, a cellulose nitrate lacquer and an acetobutyrate emulsion.

16. The process of claim 15, in which the liquid preparation further contains a casein emulsion.

* * * * *